UNITED STATES PATENT OFFICE.

CORNELIUS S. BUSHNELL, OF NEW HAVEN, CONNECTICUT.

ROOFING COMPOUND.

SPECIFICATION forming part of Letters Patent No. 389,050, dated September 4, 1888.

Application filed July 9, 1888. Serial No. 279,452. (No specimens.)

*To all whom it may concern:*

Be it known that I, CORNELIUS S. BUSH-NELL, of New Haven, in the county of New Haven and State of Connecticut, have invented a new Roofing Compound; and I do hereby declare the following to be a full, clear, and exact description of the same.

This invention relates to a composition for covering roofs, having for its object a cheap, durable, water-proof, and substantially fire-proof compound; and it consists in the combination of ingredients, as hereinafter particularly described.

Take of soapstone ground substantially to powder sixty parts, to which add resin twenty parts, and to this add of the article known to commerce as "B. S." fifteen parts, and silicate of soda five parts. The ingredient "B. S." is the sediment derived from petroleum when standing in tanks, and which material removed from the tanks, after the oil has been drawn off, is commercially known as "B. S."

The several ingredients, in the proportions above mentioned, are mixed in a suitable tank prepared for the purpose, under heat sufficient to bring the parts to a soft plastic composition, and while so heated the composition is ready for application, and it is applied with a trowel or similar instrument and spread upon the roof.

Preferably the roof is first covered with paper; but it may be applied directly to the wood, or upon a surface preliminarily prepared in any suitable manner. The silicate of soda gives to the composition the requisite hardness and fire-proof quality, and the "B. S." gives it an elasticity which adapts it to great changes of temperature without cracking or blistering.

The proportions which are above stated are believed to produce the best result; but slight variations may be made in the proportions without departing from the spirit of the invention.

I claim—

The herein-described composition for roofing, consisting of ground soapstone, resin, the sediment derived from petroleum when standing in tanks, commercially known as "B. S.," and silicate of soda, in the proportions and substantially as described.

CORNELIUS S. BUSHNELL.

Witnesses:
JOHN E. EARLE,
J. H. SHUMWAY.